US009036547B2

(12) United States Patent
Diaz et al.

(10) Patent No.: US 9,036,547 B2
(45) Date of Patent: May 19, 2015

(54) METHOD AND SYSTEM FOR THE IMPROVEMENT OF ROUTING IN COMMUNICATIONS NETWORKS PROVIDING MULTIMEDIA SERVICES OVER IMS NETWORKS

(75) Inventors: Alfonso Gomez Diaz, Madrid (ES); Rogelio Martinez Perea, Madrid (ES); Jose Luis Tejedor Gutierrez, Madrid (ES)

(73) Assignee: VODAFONE GROUP PLC, Newbury, Berkshire (GB)

( * ) Notice: Subject to any disclaimer, the term of this patent is extended or adjusted under 35 U.S.C. 154(b) by 68 days.

(21) Appl. No.: 13/432,191

(22) Filed: Mar. 28, 2012

(65) Prior Publication Data

US 2012/0250622 A1    Oct. 4, 2012

(30) Foreign Application Priority Data

Mar. 28, 2011    (ES) .................................. 201130468

(51) Int. Cl.
*H04B 7/216* (2006.01)
*H04L 29/06* (2006.01)
*H04L 12/725* (2013.01)
*H04L 12/911* (2013.01)

(52) U.S. Cl.
CPC .......... *H04L 65/1016* (2013.01); *H04L 45/306* (2013.01); *H04L 45/308* (2013.01); *H04L 45/302* (2013.01); *H04L 47/781* (2013.01); *H04L 65/1069* (2013.01); *H04L 65/80* (2013.01)

(58) Field of Classification Search
USPC ........................................................ 370/328
See application file for complete search history.

(56) References Cited

U.S. PATENT DOCUMENTS

| 6,763,233 | B2 * | 7/2004 | Bharatia ........................ 455/433 |
| 8,213,363 | B2 * | 7/2012 | Ying et al. .................... 370/328 |
| 8,243,715 | B2 * | 8/2012 | Itzkovitz et al. .............. 370/352 |
| 8,457,110 | B2 * | 6/2013 | Amirijoo et al. .............. 370/352 |
| 8,509,799 | B2 * | 8/2013 | Park et al. .................. 455/452.2 |
| 2003/0036392 | A1 * | 2/2003 | Yukie ............................ 455/461 |
| 2006/0039397 | A1 * | 2/2006 | Hari et al. ..................... 370/431 |
| 2007/0238467 | A1 * | 10/2007 | Buckley et al. ............... 455/445 |
| 2011/0029558 | A1 * | 2/2011 | Chua ............................. 707/769 |
| 2012/0083265 | A1 * | 4/2012 | Noldus ....................... 455/426.1 |
| 2012/0224564 | A1 * | 9/2012 | Paisal et al. ................... 370/331 |
| 2012/0265849 | A1 * | 10/2012 | Bakker et al. ................. 709/217 |
| 2013/0070667 | A1 * | 3/2013 | Ku et al. ....................... 370/328 |

OTHER PUBLICATIONS

T. Kovacik, et al., "Service Availability Enhancement in Multimedia Networks", Faculty of Informatics and Information Technologies of Slovak University of Technology, 6 pages.
X. Zhu, et al., "Experiences in Implementing an Experimental Wide-Area GMPLS Network", IEEE Journal on Selected Areas in Communications, vol. 25, No. 4, Apr. 2007, pp. 82-92.
Spanish Search Report dated Sep. 30, 2013.

* cited by examiner

*Primary Examiner* — Ian N Moore
*Assistant Examiner* — Lakeram Jangbahadur
(74) *Attorney, Agent, or Firm* — Workman Nydegger

(57) ABSTRACT

The present invention proposes a method and system which improves the assignment of resources in communication networks providing multimedia services, which allows offering different qualities of service to the users of an IMS network. To that end, a new node which controls signaling, routing and security for the operator according to the content of the session and the user is introduced in the method or system.

23 Claims, 4 Drawing Sheets

METHOD AND SYSTEM FOR THE IMPROVEMENT OF ROUTING IN COMMUNICATIONS NETWORKS PROVIDING MULTIMEDIA SERVICES OVER IMS NETWORKS

TECHNICAL FIELD OF THE INVENTION

The present invention has its application in the field of multimedia communications, and more specifically in that of routing different types of multimedia content in communications networks providing multimedia services by means of using, for example, IMS (IP multimedia subsystem) technology.

BACKGROUND OF THE INVENTION

The future deployment of the RCS (Rich Communications Suite) service requires the use of IMS networks. IMS (IP-Multimedia Subsystem) technology was designed both for third generation mobile telephony networks, 3GPP, and for networks of other types, such as WiFi networks and other independently accessed service platforms, including broadband access through a landline.

IMS (IP-Multimedia Subsystem) was designed to allow operators (as stated, mainly mobile telephony operators, although they can also be of other types) to provide a wide range of multimedia services in real time, allowing the co-existence of these advanced packet technology-based multimedia services with traditional circuit switching-based services.

The IMS networks of mobile operators currently offer the possibility for users to set up multimedia sessions with content of any type such as voice, video, images, instant messaging, sending files between two terminals through a wire or wireless data link and an infinite number of additional services. These sessions originate from a user (user 1) of one operator (operator 1) through an IMS network and will end in user 2 who can belong to the same operator or to a different operator (operator 2).

These IMS networks are in an early phase of deployment in which there are no LTE ("Long Term Evolution", fourth generation networks) radio access networks; in these LTE networks, the quality of service (QoS) would be assured for multimedia sessions. At present however, this is not the case for IMS networks.

In currently deployed IMS networks, there is certain control over the quality of service when accessing through the radio access carrier of the communications operator, but there is no reliable control over the quality of service as it exists in other networks, such as in circuit-switched networks, where the quality of service offered is assured.

This problem is aggravated because the IMS networks are independent of the method of access, i.e., in addition to the radio network of the mobile operator, any packet carrier such as a public WiFi network or any provider may access the IMS network. Many of these accesses are unrelated to the operator providing IMS services and therefore the operator does not control the quality offered and consequently cannot assure the QoS necessary for determined services. For this reason these new multimedia communications (of services such as RCS or other multimedia services over IMS networks) do not comprise the use of voice communications because it is a real-time service which does not allow latencies or excessive losses of packets to maintain a good voice quality, therefore the voice would need a certain quality of service assured (as is done by the carriers of the operator in the switched network carriers).

It can thus be stated that the RCS service presents the problem that in current IMS systems (until the LTE networks are completely deployed) the quality of service cannot be assured and in many cases, the same quality of service ("best possible performance") will be offered to all users and, therefore, services requiring assured quality (such as voice services) which a priori could be offered over the IMS network, cannot appropriately be offered.

In services for exchanging data or video between terminals, the "best possible performance" of the radio access network is usually accepted by both the user and by the operators for this type of service even though this may represent a lower level of quality than is required and, therefore, it is possible for these services to use the IMS network without assured quality of service. However, this poses a question: "what happens if the user requests a service which does require a minimum quality that would not be assured by the IMS network?" Said service could not be carried out or it would be offered with poor quality. An example of this is voice communications, where echo and unintelligible or broken up voice scenarios could occur if the quality of service is not assured.

Hence, users of these services and other multimedia services over IMS networks need to be registered in the IMS network but further remain registered on the switched network to receive voice, which is a service that needs assured quality, in addition to SMS and MMS. This gives rise to a new scenario in which the same terminal/user is simultaneously registered in two networks (IMS and CS network), being able to receive communications from any of the two carriers. This situation has not happened until now.

Moreover, in this scenario, the currently deployed IMS network does not assure the operator that the user in an IMS Session will be provided with multimedia sessions with a different quality of service according to the type of user, offering better service (prioritizing) to special users (for example those who pay higher rates). In other words, it has the drawback that the IMS network in current systems will not allow the user to access multimedia services with a better quality of service even though he is willing to pay for it or has a greater need, which is a lost business opportunity for the operator.

Nor will present implementations allow, therefore, offering a different quality of service depending on other factors, such as the origin of the user, network load, time of day or any other factor that may be useful for the operator when differentiating the quality of service offered.

Therefore, it is necessary to solve these problems of systems used today and this is the purpose of the present invention.

SUMMARY OF THE INVENTION

In accordance with a first aspect of the present invention there is provided a method for routing communications between users of one or more communications network operators, each operator having packet switched and circuit switched networks for providing communications to the respective said users of the operator, the method comprising the following steps:

A) receiving, at a service identifier node of a first network operator from the packet switched network of the first network operator, a request communication which is addressed to a recipient user, said request communication including one or more communication features;

B) comparing, by the service identifier node, the said communication features of the request, with predetermined communications features for the type of communication requested, said predetermined communication features being associated with one or more of: predetermined users of the first network operator, or, other said network operators; and, C) routing the communication to the recipient user through the circuit switched or packet switched network of the said one or more network operators in dependence upon the comparison.

The present invention proposes a method and system which improves the assignment of resources in communication networks providing multimedia services, which allows offering different qualities of service to the users of, for example, an IMS session. To that end, a new node which may controls signaling, routing and security for the operator according to the content of the session and the user is introduced in the method or system.

As has been explained, Quality of Service is an important factor to consider when providing communications services over a network. It is advantageous therefore that the predetermined communications features used in step (B) may comprise a quality of service mark which indicates if the user wishes to use a network having an assured quality of service for said type of communication requested. If this is the case then the routing in step (C) may be made to the circuit switched network of the said one or more network operators in the event that an assured quality of service is indicated by the mark. The predetermined communications features may also or alternatively include one or more of: preferences of the user for receiving the respective type of communication; the traffic conditions of the network(s); the user's rate; or any other factor that conditions the network in which the communication is to be received.

When routing the request for communication towards the circuit-switched network, this may be achieved by the service identifier node modifying the recipient included in the request for communication by adding a prefix which indicates the request should be routed towards the circuit-switched network and then routing the communication through the circuit-switched network. A convenient means of achieving this is by returning the request to a serving call session control function node (S-CSCF), from which it may have originally been directed to the service identifier node, before onward routing through the network to the recipient user. However, in an alternative approach the service identifier node may obtain the direction of the "following" node towards which the request is to be routed and then route the request to the said following node. In turn, the said following node may route the communication through the circuit switched network.

The predetermined communications features may include "Feature-Tags" which are indicators of the type of communication required and the codecs to be used for each type of communication. Furthermore, the communication features may include the alternative types of communication that can be used in the event of a "negotiation" condition.

The method is intended to be implemented upon networks having component packet switched functionality and it will be appreciated therefore that an example of such a packet switched network is an IP-Multimedia Subsystem (IMS) network.

Returning to the implementation of the method, prior to step (A) a serving call session control function node (S-CSCF) of the IMS network may receive the request addressed to the recipient user and the S-CSCF node then checks whether the recipient user is a user of the first network operator or a user of another network operator. Preferably, if the recipient user is a user of the first network operator then the S-CSCF node consults an HSS (Home Subscriber Server) node, and then routes the request from the S-CSCF node to the service identifier node. Typically the service identifier node has access to a database, which is accessed in step (B) of the method, and which includes the set of communication features allowed for each user and, for each type of communication allowed, an indication of the type of network to which the communication should be routed for said type of communication.

The recipient user may be a user associated with the first communication network operator or one of a further communication network operator. In the latter case the service identification node may hold no details of the recipient user in question. If the recipient user is a user of a further network operator, then, prior to step (A) the serving call session control function node (S-CSCF) of the first network operator preferably consults a Domain Name Server (DNS) node and, as a result, the request is sent by the S-CSCF node to the service identification node. In this case, if the requested communication is a voice-type communication or it is indicated that the second network operator wants the communication to be routed through the circuit-switched network (due to characteristics stored in the service identification node database for example) then the service identifier node will route the message to request communication towards the circuit-switched network.

If the requested communication is not a voice-type communication and it is not indicated that the second operator wants the communication to be routed through the circuit-switched network, the service identification node may route the request for communication to the packet switched network of the second operator.

It is also preferred that, where the communication request does not include known communication features, it is assumed that the communication is a voice-type communication. It may also be assumed that voice-type communication is considered allowed for all users.

Conveniently the communication request message may be a SIP INVITE message and the type of communication is selected from the group: voice, video, images, instant messaging, sending files between two terminals or any other type of multimedia communication.

Whilst the method lends itself to various types of known networks having interfaced circuit switched and packet switched functionality and hardware, it will be understood that, advantageously, one or more of the communications network operators is a mobile telephony operator. The use of the method in mobile telephony provides particular advantages since such networks arguably experience the greatest challenges in delivering communications between users reliably.

The invention particularly has the following advantages with respect to the methods used today:

It allows the service provider to provide the user with multimedia sessions with a different quality of service. This will normally be done according to the "priority" of the user, which in most cases will depend on said user's rate.

It allows performing selective routing of the session depending on different factors such as user preferences (for example, the user cannot receive a certain service through IMS but he can through the switched network), operator preferences, billing and so on.

It also allows detecting malformed messages or messages with inappropriate codecs or types of sessions which are not to be allowed since they may cause security risks due to loading the network or another type of attacks or frauds for the operator.

It assures that the interconnection traffic is through the desired network, because in agreements between operators the manner of charging an exchange of sessions may vary and it may be more advantageous to use one network or the other for the interconnection of determined services.

It allows a gradual migration of services towards the IMS network for the inclusion of LTE access networks.

In a first example, the present invention describes a method for the improvement of routing of an IMS (IP Multimedia Subsystem) network communications, the IMS network belonging to a first communications operator wherein the first communications operator also has a circuit-switched network deployed for communications, the method comprising the following steps:

a) The S-CSCF node of the IMS network receives a message to request communication addressed to a user A, said message includes information about said communication features; the S-CSCF node checks whether the user A belongs to the first communications operator or to a second communications operator.

b) If the user A belongs to a second communications operator, go to step g).

c) If the user A belongs to the same communications operator, the S-CSCF node consults an HSS node, which indicates that the request must be routed to a node called Service Identifier Application Server, SIAS, and the S-CSCF node sends the request to the SIAS node, the SIAS node having access to a database which includes for each user the set of communication features allowed for said user and for each type of communication allowed an indication of the type of network to which the communication should be routed for said type of communication.

d) Once the request for communication is received, the SIAS node compares the communication features included in the request with the communication features stored in the database allowed for said user.

e) If said communication features are not allowed for said user A or said user A is not in the database, an error message is sent to the S-CSCF which aborts the communication and the method ends.

f) If the requested communication is voice-type communication or it is indicated in the database that the user wants the communication to be routed through the circuit-switched network for the type of communication indicated in the request, the SIAS node will route the request towards the circuit-switched network and the method ends.

g) If the requested communication is not voice-type communication and it is not indicated in the database that the user wants the communication to be routed through the circuit-switched network for the type of communication indicated in the request for communication, the SIAS node returns the request to the S-CSCF node, this node routing the communication through the IMS network and the method ends.

h) If the user A does not belong to the same communications operator but rather to a second operator, the CSCF node consults the DNS, Domain Name Server, node which indicates routing the request to the Service Identifier Application Server, SIAS, node and the S-CSCF node sends the request to the SIAS node.

i) If the requested communication is a voice-type communication or it is indicated that the second operator wants the communication to be routed through the circuit-switched network, the SIAS node will route the message to request communication towards the circuit-switched network and the method ends.

j) If the requested communication is not a voice-type communication and it is not indicated that the second operator wants the communication to be routed through the circuit-switched network, the SIAS node routes the request for communication to the IMS network of the second operator.

In addition to the method of the first aspect, in accordance with a second aspect of the invention there is provided a system for routing communications between users of a network, the network comprising one or more communications network operators, each operator having packet switched and circuit switched networks for providing communications to the respective said users of the operator, the system comprising a service identifier node of a first network operator, configured for receiving a request communication from the packet switched network of the first network operator, the request communication being addressed to a recipient user, said request communication including one or more communication features, wherein the service identifier node is further configured to compare the said communication features of the request, with predetermined communications features for the type of communication requested, said predetermined communication features being associated with one or more of: predetermined users of the first network operator, or, other said network operators; and, wherein the said one or more first communications network operators is arranged to route the communication to the recipient user through the circuit switched or packet switched network of the said one or more network operators in dependence upon the comparison.

The second aspect of the invention therefore reflects new or reconfigured hardware in comparison with known systems, particularly in terms of the service identifier node. The service identifier node preferably comprises a database (including having access to a remote implementation of such a database) which includes for each user of the first operator a set of predetermined communication features allowed for said user and for each type of communication allowed, an indication of the type of network in which the communication should continue for said type of communication. Furthermore as an alternative or in addition, the service identifier node may comprise a database (which may be a common database with that mentioned for the users above) which includes for each other communications network operators with which the first operator can be interconnected, a set of communication features allowed for said operator and for each type of communication allowed, an indication of the type of network in which the communication should continue for said type of communication.

It is preferred that the service identification node is a service identification application server (SIAS).

Preferably the system is configured when in use to perform the method according to the first aspect of the invention.

In an example of the second aspect, there is described a system for the improvement of routing of an IMS (IP Multimedia Subsystem) network communications, the IMS network belonging to a first communications operator, wherein the first communications operator also has a circuit-switched network deployed for communications, the system comprises a node called Service Identifier Application Server, SIAS, with access to a database which includes for each user of the first operator the set of communication features allowed for said user and for each type of communication allowed, an indication of the type of network in which the communication should continue for said type of communication and optionally for each operator with which the first operator can be interconnected, the set of communication features allowed for said operator and for each type of communication allowed, an indication of the type of network in which the communication should continue for said type of communication.

In operation, said SIAS node of this example receives from the S-CSCF of the IMS network a message to request communication addressed to a user A, said message includes information about said communication features. If the user A belongs to the first communications operator, once the request for communication is received, the SIAS node compares the communication features included in the request for communication with the communication features stored in the database allowed for said user. If said communication features are not allowed for said user A or said user A is not in the database, an error message is sent to the S-CSCF.

If the requested communication is voice-type communication or it is indicated in the database that the user wants the communication to be routed through the circuit switched network for the type of communication indicated in the request for communication, the SIAS node routes the message to request communication towards the circuit switched network. If the requested communication is not a voice-type communication and it is not indicated in the database that the user wants the communication to be routed through the circuit network for the type of communication indicated in the request for communication, the SIAS node returns the request to S-CSCF node without modifying it.

If the user A does not belong to the same communications operator but rather to a second operator, once the request for communication is received, the SIAS node compares the communication features included in the request for communication with the communication features allowed for said second operator stored in the database if there are any. If said communication features are not allowed for said second operator an error message is sent to the S-CSCF. If the requested communication is voice-type communication or it is indicated in the database that the second operator wants the communication to be routed through the circuit network for the type of communication indicated in the request for communication, the SIAS node routes the message to request communication towards the circuit-switched network. If the requested communication is not voice-type communication and it is not indicated in the database that the user wants the communication to be routed through the circuit network for the type of communication indicated in the request for communication, the SIAS node returns the request to the S-CSCF node without modifying it.

In a third aspect of the present invention there is provided computer program comprising computer program code means suitable for performing the steps of the method of the first aspect, when the aforementioned program is executed in a computer, a digital signal processor, a field-programmable gate array, a specific integrated circuit of the application, a microprocessor, a microcontroller or any other form of programmable hardware, included in a distributed manner.

DESCRIPTION OF THE DRAWINGS

Some examples of the invention are now described with reference to the accompanying drawings, in which.

DETAILED DESCRIPTION OF THE INVENTION

The present invention proposes a "customized" treatment for each service and/or user in an IMS network which allows solving the aforementioned problems.

Currently, every time there is a larger number of users who are registered in the IMS network of their mobile operator, to access the advanced multimedia services offered by these networks (regardless of the fact that they are at the same time registered in other networks such as conventional circuit-switched networks), when communication is set up, when the operator detects that one of these users is a registered IMS user. The communication will be passed to the IMS network and, therefore, the quality of service will not be assured (because, as mentioned, since current IMS networks are not deployed on LTE mobile networks, they do not always assure the desired quality of service).

In other words, packet networks still coexist in mobile operators with circuit-switched networks (2G, 3G) on which there is assured quality of service. However, when the operator receives a call addressed to a user registered in an IMS network, it will be sent to the user through the IMS packet network without the possibility of routing towards another network even in cases in which an assured quality of service is needed. This problem will be aggravated in the future because the deployment of functionalities such as RCS will mean that there are increasingly more users registered in the IMS network and they will experience this problem.

Figure 1:
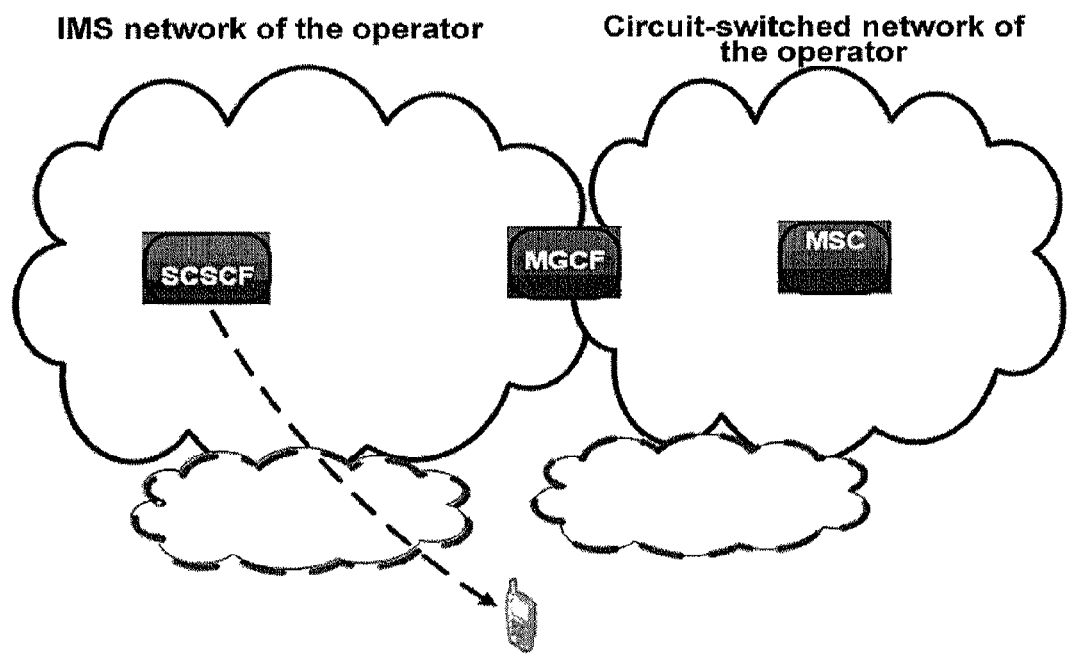
FIG. 1 schematically shows the scenario in which a multimedia session towards a user is set up in the systems of the state of the art.

This is shown in FIG. 1. When a communication set up originally in an IMS network for a user registered in that network reaches the S-CSCF node (Serving Call Session Control Function Node), the latter automatically routes it through the packet network towards the user, without the possibility of routing through the MGCF (Media Gateway Control Function, a node which allows the interconnection between the IMS network and the circuit-switched network of one and the same operator) to the MSC (Mobile Switching) of the circuit network, where the call would have the required quality of service.

As previously stated, the object of the invention is to prevent these problems, allowing a treatment customized of each session in IMS networks such that it allows offering different qualities of service and different routings depending on the user and on the content of the service, whilst controlling the security of the session at the same time. To that end, a new node, called Service Identifier Application Server (SIAS), is introduced.

To that end, this node, from the network of the operator, is capable of identifying which type of multimedia session in the IMS domain is to be used in order to allow it to continue, and send it towards the switched network or even interrupt it according to the desired security configuration.

Figure 2:
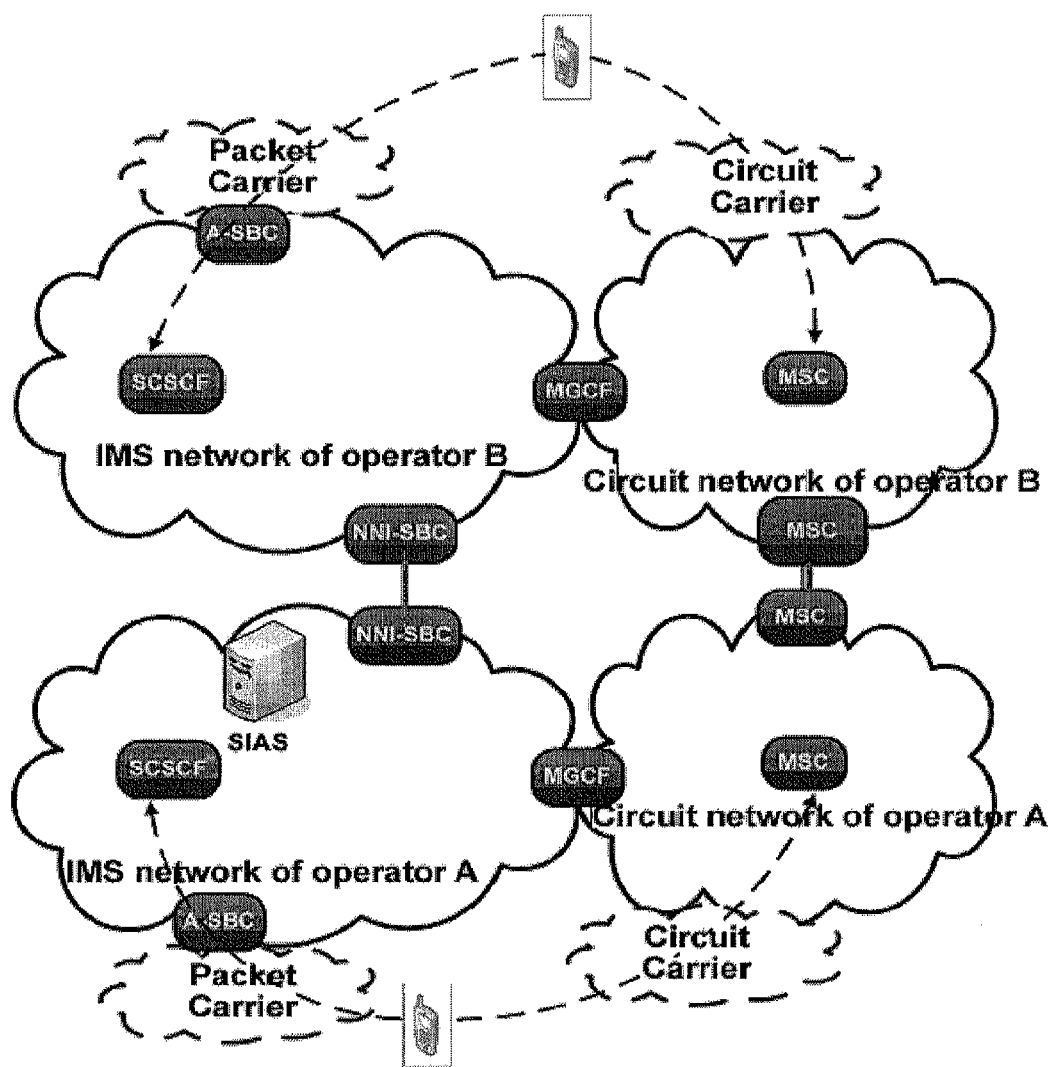
FIG. 2 schematically shows a system in which the present invention is used in a possible implementation of the invention.

FIG. 2 schematically shows a typical scenario in which the present invention is used. There are 2 mobile telephony operators A and B in it, as is common, the IMS packet network co-exists with the traditional circuit-switched network in both operators. The users of these operators can access both types of networks and therefore the terminals of said users are registered in both networks.

As is common, the circuit-switched networks (also called switched network) of both operators are interconnected through the MSCs and the IMS networks of both operators are interconnected through the NNI-SBC (Network-Network Interface Session Border Controller). Within each operator, the IMS network is connected with the circuit switched network through the MGCF node. In other words, there usually is not a direct connection between the IMS network of one operator and the circuit switched network of the other.

The node proposed in the present invention, SIAS, would be a network service with a SIP interface in the IMS network of the Operator and a database with service profiles of the users of the operator. The operator will be responsible for operating and maintaining this database which can be done through the provision systems and which must be available for the correct operation of the SIAS. This database can assign a profile by default, which will be applied to those users for whom specific information has not been entered in the database. It receives signaling from the IMS network through the SIP interface.

Every time a user of any operator tries to maintain a session with the users of the operator with SIAS, the S-CSCF (node receiving the IMS sessions) will send the SIP INVITE messages towards this interface of the SIAS as a result of a standard IMS terminating trigger which will be indicated by the HSS (Home Subscriber Server). Likewise, when a user of the operator of the SIAS tries to communicate with a user of another operator, as a result of the DNS (Domain Name System) and ENUM (for telephone numbers) resolution, this node will indicate that the INVITE must be sent towards the SIAS in a standard manner.

Based on this incoming signaling in the SIAS, and optionally on the SIP signaling data of the network and on the data it has stored in the databases, the SIAS will make a decision on:

Allowing the session to continue without quality of service, returning the INVITE towards the S-CSCF or it will send it to the NNI-SBC in the event that the recipient is not from the same operator Interrupting the session set up (with SIP error message of the type 400), optionally reporting the cause of said error. This will occur, for example, if the session is not allowed for said user.

Re-routing the call towards the circuit network by means of the inclusion of a prefix in the Request-URI (identification of the recipient) of the INVITE which will force the call to go towards the circuit switched network through the MGCF, the IMS session becoming a circuit switched communication. In addition to directing the call towards the switched network, the prefix can have other purposes. Thus, depending on the prefix used, it is possible to bill differently, performing special routing and so on. Optionally, this re-routing could be done by the same SIAS using instead of a prefix added to the SIP INVITE an IP address or FQDN (Full Qualified Domain Name) which allows directly routing the SIP INVITE towards the indicated node. This service will need for the operator to have previously entered the users in its database with rules of use assigned to each user. These rules are referred to as user profiles and they will indicate what they can and cannot use and the preference of a determined user.

These user profiles will contain the following, among other parameters:

The Feature-Tags (capacity indicators) allowed for said user with their associated codecs for multimedia sessions. In the INVITE message the Contact header contains fields referred to as Feature-Tags (capacity indicators) indicating what type of session is being set up, that is, if it is a file exchange session or a real-time text exchange session, or photo sharing, etc. If the Feature-Tag is not included in the Contact header, it will be assumed that it is a voice session and it will be sent towards the switched network. It can also be verified whether or not it is a voice session by verifying the type of codec that is going to be used.

If the Feature-Tag included in the Contact header is not among the list of Feature-Tags allowed for said user, the SIAS would interrupt the session and give an error. In other words, if the type of session requested in the INVITE is not among those allowed for the user, it will give an error with a SIP error response of the type 400 (these are the error messages of the SIP protocol).

Furthermore, each Feature-Tag of the INVITE is associated with at least one type of codec that is going to be used for that session and which is included in the SDP (Session Description Protocol) part of the INVITE message. If the codec included in the SDP for the session does not coincide with one of the codecs associated with that Feature-Tag stored in the database of the SIAS, the SIAS would interrupt the session and give a message. In other words, if the Feature-Tag indicates a messaging service but the codec is not a messaging codec, an error would occur.

Likewise, the Accept-Contact header of the SIP INVITE message indicates the types of alternative sessions for that session in the event that the type of session requested is not accepted by the recipient (i.e., if there is a negotiation). The SIAS will check if those alternative types of session (identified by the Feature-Tags) are in its list of those allowed for the user and if one of them is not, it will reject the INVITE.

In turn, each Feature-Tag (i.e., each type of session) in the database will have a network indicator which will indicate the preferences of the user in terms of the network through which he wants to route the session. Thus, the network indicator can simply be a "Quality of service" mark which indicates whether or not a determined quality of service is required (and therefore needs to be routed towards the circuit-switched network); in other cases, it may also indicate other factors such as if the user has a preferred network for receiving sessions of that type, if the user has a special rating systems which makes him always use a determined type of network for that service or generally any indication identifying the network through which the session must be routed.

Circuit routing indicator: This can be a routing prefix or the address (IP or QDFN) of the node to which the communication must be routed so that it is sent to the circuit switched networks. For sessions needing quality of service or because the network indicator in the database expressly states that routing is to be through a circuit switched network, the communication will be routed through the circuit switched networks. This circuit routing indicator may vary depending on the user and optionally on the service. For example, different routing prefixes can give rise to different rating systems. In most the cases the routing will be towards circuit switched networks though it could optionally be routed towards another type of network.

In the event that a session is to be sent from the IMS network of the operator having a SIAS (operator A) towards another operator (operator B), i.e., the target user does not belong to the operator having the SIAS node, the operator will first send the INVITE towards SIAS (as a result of the ENUM and the Breakout Gateway Control Function (BGCF) resolution) for the latter to analyze the type of session and decide whether to sent it through the interconnection of IMS networks or through the interconnection of circuit switched networks.

For interconnection with other operators, there will be configuration parameters in the database which, in this case, will not be associated with the user (because he does not belong to the operator having the SIAS) but rather to the operator to which the user belongs:

Feature-Tags and their codecs for multimedia sessions allowed for said operator. In this case, the same analysis will be performed as in the previous case. This makes sense because depending on the target operator, there may be types of sessions or codecs that are not allowed.

Circuit routing indicator for interconnection sessions which need quality of service or which thus expressly indicate it.

Each Feature-Tag in the database will have an indicator to know whether or not it needs to be routed towards the circuit switched network with quality of service. In the event that it needs to be routed towards the circuit switched network, the routing indicator which will route the session towards the circuit switched network of the source operator, which will be responsible for it being sent to the circuit switched network of the target operator and finally to the user, will be selected.

Optionally, the IMS network of the source operator could have a direct connection with the circuit-switched network of the target operator, but this is not common.

In the above discussion, it is assumed that the only network alternative to the IMS network is the switched network, but it is also possible for there to be other types of alternative networks and in that case, the network indicator accompanying each Feature Tag will indicate towards which network it should be routed.

The operation of the present invention is described below in two possible scenarios, in sessions started from an operator having a SIAS node:

Scenario 1: IMS Multimedia Session Towards a User of the Same Operator.

In this scenario (depicted in FIG. 3, the dotted lines indicate that the message is an error message) an IMS session which may have had any source (circuit switched network or IMS) needs to be delivered to recipient/target "user A" who belongs to Operator A which has implemented a SIAS. It is SIAS who will verify the need for quality in the session, the security and the suitability of the signaling. The main steps that are followed are:

1) Like any terminating INVITE message, it will reach the S-CSCF (element of the IMS network which is responsible for orchestrating the call and which is always in the signaling path). This INVITE message will cause the S-CSCF to analyze which is the next hop in the signaling for the user A. This configuration is included in the HSS (node of the IMS network incorporating the next hop in signaling for each message addressed to the user A) and which will indicate to the S-CSCF that it has to send the INVITE to the SIAS.

2) The S-CSCF will send the INVITE towards the SIP interface of the SIAS. The latter will accept the message.

3) SIAS will analyze the recipient of the INVITE.

A) If the recipient is not in its database, it will give an error message and the session will not progress.

B) If the recipient is in its database, it will review that user profile retrieving the Feature-Tags allowed, the codecs for the Feature-Tags and the circuit re-routing prefix and will continue processing the INVITE 4) It will analyze the Contact and Accept-Contact headers of the INVITE in search of Feature-Tags not allowed to end the session with an error message. In the event that all the Feature-Tags (main and alternative if any) are allowed, it will analyze the codec in the SDP (protocol specifying the codec for the multimedia session) part of the INVITE and verify that the codec indicated in the SDP is among the codecs allowed for the Feature-Tag of the Contact header. If they are allowed, it will go on to step 5.

A) If any Feature Tag is not allowed or the codec is not allowed, it will return an error message and the session will not progress.

B) In the event that the INVITE does not include any Feature-Tag, it will be assumed that it is a voice call.

5) It will be verified if the Feature-Tag of the Contact has the "quality of service" mark in the database that has been configured by the Operator in the SIAS or generally if it has an indicator which indicates the preferences concerning the type of network to which it is to be routed.

Figure 3:
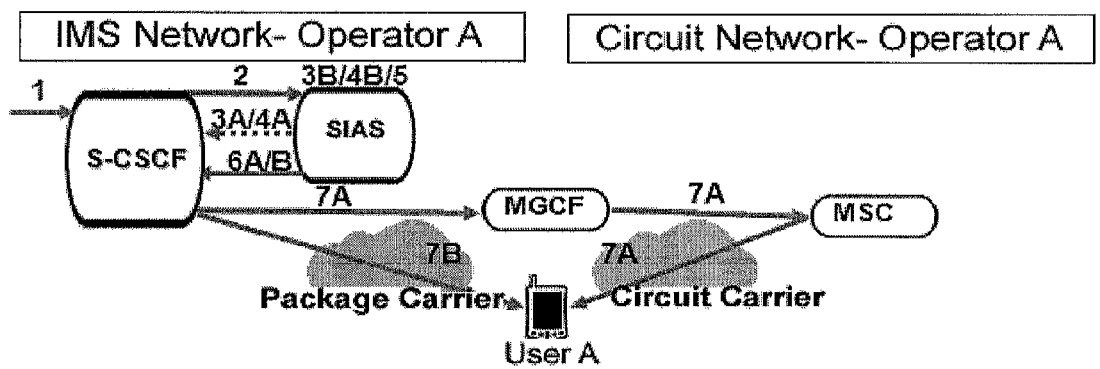
FIG. 3 shows the operating flow chart of the present invention in a possible implementation of the invention in which the target user of the IMS session belongs to the same operator.

6) A) If it is a voice call or Feature-Tag with the "quality of service" mark or if it is expressly indicated that it is to be routed through the circuit switched network: here there are several options according to the nature of the routing indicator, so in one case the SIAS will modify the recipient of the INVITE by placing before it the routing prefix corresponding to the desired network (in this case the circuit switched network) which the database indicates to the original recipient (user A) and will return it to the S-CSCF (and would continue in step 7A) and in another case, the SIAS will directly route towards the switched network using the IP address or FQDN which the database in the routing indicator indicates. FIG. 3 illustrates the first case.

B) Feature-Tag which does not require quality of service or it is expressly indicated that routing is to be through the IMS network: SIAS will return the INVITE to the S-CSCF without adding anything so that the latter can deliver the message to the user A and set up the media session through the current network, the IMS network. It continues to step 7B.

7) A) When the CSCF receives the INVITE with the circuit routing prefix, it will cause the INVITE to be sent to the MGCF. The MGCF is the node acting as a connection port between the IMS network and the circuit switched network and therefore the call will continue towards the recipient over the circuit switched network in a conventional manner.

B) In the case of not receiving the routing prefix, the INVITE will be sent to the user through the packet connection with the IMS network These steps also apply to the event that the communication is started by a user of another operator and the recipient is a user of the operator being analyzed which has implemented a SIAS node.

Scenario 2: IMS Multimedia Session Towards a User of Another Operator.

Figure 4:
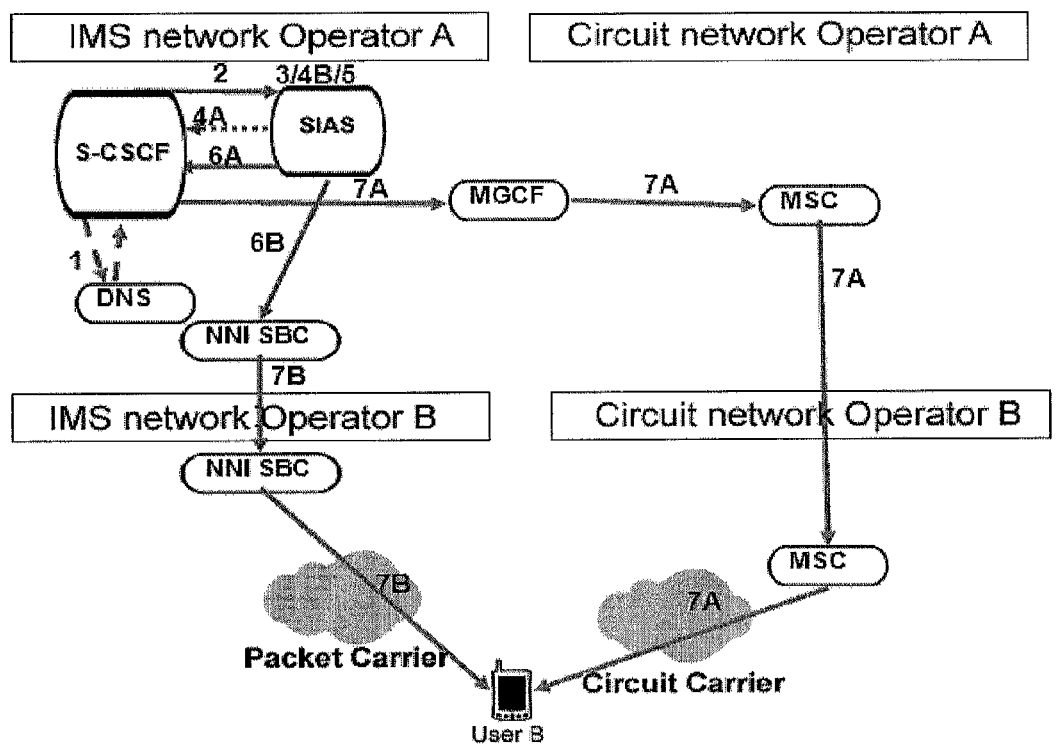
FIG. 4 shows the operating flow chart of the present invention in a possible implementation of the invention in which the target user of the IMS session belongs to a different operator.

In this scenario (depicted in FIG. 4, the dotted lines indicate that the message is an error message) an IMS session which may have had any source (circuit switched network or IMS) needs to be delivered to "user B" who belongs to the Operator B, different from the Operator used to explain the operation of the SIAS.

1) Like any INVITE message intended for another operator, it will reach the SCSCF and when the latter detects that the user is from another operator, it will consult the DNS and ENUM to know the interconnection with said target operator.

The DNS will inform the SCSCF to direct the INVITE towards the SIP interface that is configured for the domain of said target operator (i.e., operator B with the domain operatorB.com). In this case, the Operator of the DNS of operator A will be configured so that the SIP interface indicated by the DNS is that of the SIAS of operator A, such that it is in the path of all the messages towards other operators.

2) The SCSCF (directed by the DNS) sends the INVITE towards the SIP interface of the SIAS. The latter will accept the message.

3) Since the user is of another operator, the SIAS will analyze SIP protocol INVITE based, as explained above, on the Feature-Tags and other information included in its database for interconnection sessions with the corresponding operator. It is different from the previous case which performed the analysis based on the rules of the service profile of the target user. Therefore it will retrieve the Feature-Tags allowed, the codecs for the Feature-Tags for interconnection with the operator B and the circuit re-routing indicator and will continue processing the INVITE.

4) As in the previous scenario, it will analyze the Contact and Accept-Contact headers of the INVITE in search of Feature-Tags not allowed to end the session with an error message. In the event that all the Feature-Tags (main and alternative if any) are allowed, it will analyze the codec in the SDP (protocol specifying the codec for the multimedia session) part of the INVITE and verify that the codec indicated in the SDP is among the codecs allowed for the Feature-Tag of the Contact header.

A) If any Feature Tag is not allowed or the codec is not allowed, it will return an error message and the session will not progress.

B) In the event that the INVITE does not include any Feature-Tag, it will be assumed that it is a voice call.

5) As in the previous scenario, it will be verified if the Feature-Tag of the Contact has the "quality of service" mark in the database that has been configured by the Operator in the SIAS or generally if it has an indicator which indicates the preferences concerning the type of network to which it is to be routed.

6) A) If it is a voice call or Feature-Tag with the "quality of service" mark or if it is expressly indicated that it is to be routed through the circuit switched network: here there are several options according to the nature of the routing indicator, so in one case the SIAS will modify the recipient of the INVITE by placing before it the routing prefix corresponding to the desired network (in this case the switched network) which the database indicates to the original recipient (user A) and will return it to the S-CSCF (continues in step 7A) and in another case, the SIAS will directly route towards the switched network using the IP address or FQDN which the database in the routing indicator indicates. FIG. 3 illustrates the first case.

B) Feature-Tag which does not require quality of service or it is expressly indicated that routing is to be through the IMS network: In this case the SIAS will make the multimedia session continue through the interconnection of IMS networks, sending the session towards the NNI-SBC connecting with the network of the Operator B through the NNI-SBC of the Operator B according to the IMS network architecture standards. It continues to step 7B.

7) A) When the CSCF receives the INVITE with the circuit routing prefix, it will cause the INVITE to be sent to the MGCF. The MGCF is the node acting as a connection port between the IMS network and the switched network and therefore the call will continue towards the recipient over the switched network of the Operator A, it will be passed through normal means to the switched network of the Operator B and therefore be delivered to the user B with quality of service.

B) The NNI-SBC will send the call to the IMS network of the user B (as a result of the configuration of this node which is outside the scope of the invention). This is where the task of Operator B begins in order to deliver the session to the user B through the packet carrier of the IMS network of Operator B without being able to assure quality of service.

In this text, the word "comprises" and variants thereof (such as "comprising", etc.) must not be interpreted in an excluding manner, i.e., they do not exclude the possibility that what has been described may include other elements, steps, etc.

Having sufficiently described the nature of the invention as well as the manner of carrying it out into practice, it is hereby stated that it is possible for its different parts to be manufactured in a variety of materials, sizes and shapes, also being able to introduce in the constitution or method thereof those variations so advised by practice provided that they do not alter the fundamental principle of the present invention.

Preferred Features of Examples

A set of preferred features of the invention are set out below in numbered statements which are intended to be read in combination where indicated by cross reference of numbers:

1.—Method for the improvement of routing of an IMS (IP Multimedia Subsystem) network communications, the IMS network belonging to a first communications operator wherein the first communications operator also has a circuit-switched network deployed for communications, the method comprising the following steps:

a) The S-CSCF node of the IMS network receives a message to request communication addressed to a user A, said message includes information about said communication features, the S-CSCF node checks whether the user A belongs to the first communications operator or to a second communications operator.

b) If the user A belongs to a second communications operator, go to step g).

c) If the user A belongs to the same communications operator, the S-CSCF node consults an HSS node, which indicates that the request must be routed to a node called Service Identifier Application Server, SIAS, and the S-CSCF node sends the request to the SIAS node, the SIAS node having access to a database which includes for each user the set of communication features allowed for said user and for each type of communication allowed an indication of the type of network to which the communication should be routed for said type of communication.

d) Once the request for communication is received, the SIAS node compares the communication features included in the request with the communication features stored in the database allowed for said user.

e) If said communication features are not allowed for said user A or said user A is not in the database, an error message is sent to the S-CSCF which aborts the communication and the method ends.

f) If the requested communication is voice-type communication or it is indicated in the database that the user wants the communication to be routed through the circuit-switched network for the type of communication indicated in the request, the SIAS node will route the request towards the circuit-switched network and the method ends.

g) If the requested communication is not voice-type communication and it is not indicated in the database that the user wants the communication to be routed through the circuit-switched network for the type of communication indicated in the request for communication, the SIAS node returns the request to the S-CSCF node, this node routing the communication through the IMS network and the method ends.

h) If the user A does not belong to the same communications operator but rather to a second operator, the CSCF node consults the DNS, Domain Name Server, node which indicates routing the request to the Service Identifier Application Server, SIAS, node and the S-CSCF node sends the request to the SIAS node.

i) If the requested communication is a voice-type communication or it is indicated that the second operator wants the communication to be routed through the circuit-switched network, the SIAS node will route the message to request communication towards the circuit-switched network and the method ends.

j) If the requested communication is not a voice-type communication and it is not indicated that the second operator wants the communication to be routed through the circuit-switched network, the SIAS node routes the request for communication to the IMS network of the second operator.

2.—Method of 1 above, wherein the indicator of the type of network in which the communication should be routed is a quality of service mark which indicates if the user wants assured quality of service for said type of communication, in which case it will be understood that the network in which the communication should be routed is the circuit-switched network or not, in which case it will be understood that the network in which the communication is to continue is the IMS network.

3.—Method according to 1 or 2 above, wherein the indicator of the type of network in which the communication should be routed depends on the preferences of the user for receiving that type of communication, on the traffic conditions of the networks, on the user's rate or on any other factor that conditions the network in which the communication is to be received.

4.—Method according to any of 1 to 3 above, wherein the step of routing the request for communication towards the circuit-switched network of steps f) and i) includes the following steps: The SIAS modifies the recipient included in the request for communication, adding a prefix which indicates the request should be routed towards the circuit-switched network and returns the request to the S-CSCF node, this node routing the communication through the circuit-switched network and the method ends.

5.—Method according to any of 1 to 3 above, wherein the step of routing the request for communication towards the circuit-switched network of steps f) and i) includes the following steps: The SIAS node accesses the database and obtains the direction of the following node to route the request towards the circuit-switched network, the SIAS sending the request to this node and this node routing the communication through the circuit-switched network and the method ends.

6.—Method according to any of 1 to 5 above, wherein the communication features include indicators called Feature-Tags which are indicators of the type of communication required and the codecs to be used for each type of communication.

7.—Method according to any of 1 to 6 above, wherein the communication features include the alternative types of communication that can be used in the event of negotiation.

8.—Method according to any of 1 to 7 above, wherein the SIAS node additionally has access to a database which includes for each operator with which the first operator can be interconnected the set of communication features allowed for said operator and, optionally, for each type of communication allowed an indication of the type of network in which the communication should be routed for said type of communication and in the event that the user belongs to a second operator, the method further includes before step i):

k) Once the request for communication is received, the SIAS node compares said communication features included in the request for communication with the communication features stored in the database allowed for the operator to which the user belongs.

l) If said communication features are not allowed for said second operator or said second operator is not in the database, an error message is sent to the S-CSCF which aborts the communication and the method ends.

m) If it is indicated in the database that the operator wants the communication to be routed through the circuit-switched network for the type of communication indicated in the request for communication, the SIAS node will route the message to request communication towards the circuit-switched network and the method ends.

n) If the communication is not voice-type communication and it is not indicated in the database that the operator wants the communication to be routed through the circuit-switched network for the type of communication indicated in the request for communication, the SIAS node routes the request for communication to the IMS network of the operator to which the receiving user belongs and the method ends.

9.—Method according to any of 1 to 8 above, wherein in the event that the request for communication does not explicitly include the communication features, it is assumed that the communication is a voice-type communication.

10.—Method according to any of 1 to 9 above, wherein the voice-type communication is considered allowed for all the users.

11.—Method according to any of 1 to 10 above, wherein the message to request communication is a SIP INVITE message.

12.—Method according to any of 1 to 11 above, wherein the type of communication can be voice, video, images, instant messaging, sending files between two terminals or any other type of multimedia communication.

13.—Method according to any of 1 to 12 above, wherein the first communications operator is a mobile telephony operator.

14.—System for the improvement of routing of an IMS (IP Multimedia Subsystem) network communications, the IMS network belonging to a first communications operator, wherein the first communications operator also has a circuit-switched network deployed for communications, the system comprising:

A node called Service Identifier Application Server, SIAS, with access to a database which includes for each user of the first operator the set of communication features allowed for said user and for each type of communication allowed, an indication of the type of network in which the communication should continue for said type of communication and optionally for each operator with which the first operator can be interconnected, the set of communication features allowed for said operator and for each type of communication allowed, an indication of the type of network in which the communication should continue for said type of communication;

Said SIAS node receives from the S-CSCF of the IMS network a message to request communication addressed to a user A, said message includes information about said communication features;

If the user A belongs to the first communications operator, once the request for communication is received, the SIAS node compares the communication features included in the request for communication with the communication features stored in the database allowed for said user;

If said communication features are not allowed for said user A or said user A is not in the database, an error message is sent to the S-CSCF;

If the requested communication is voice-type communication or it is indicated in the database that the user wants the communication to be routed through the circuit network for the type of communication indicated in the request for communication, the SIAS node routes the message to request communication towards the circuit-switched network;

If the requested communication is not a voice-type communication and it is not indicated in the database that the user wants the communication to be routed through the circuit network for the type of communication indicated in the request for communication, the SIAS node returns the request to S-CSCF node without modifying it;

If the user A does not belong to the same communications operator but rather to a second operator, once the request for communication is received, the SIAS node compares the communication features included in the request for communication with the communication features allowed for said second operator stored in the database if there are any;

If said communication features are not allowed for said second operator an error message is sent to the S-CSCF;

If the requested communication is voice-type communication or it is indicated in the database that the second operator wants the communication to be routed through the circuit network for the type of communication indicated in the request for communication, the SIAS node routes the message to request communication towards the circuit-switched network;

If the requested communication is not voice-type communication and it is not indicated in the database that the user wants the communication to be routed through the circuit network for the type of communication indicated in the request for communication, the SIAS node returns the request to the S-CSCF node without modifying it.

15.—A computer program comprising computer program code means suitable for performing the steps of the method of any of 1-13 above when the aforementioned program is executed in a computer, a digital signal processor, a field-programmable gate array, a specific integrated circuit of the application, a microprocessor, a microcontroller or any other form of programmable hardware, included in a distributed manner.

The invention claimed is:

1. A method for routing communications between users of one or more communications network operators, the one or more communications network operators including at least a first network operator and a second network operator, the first network operator having at least a first packet switched network and a first circuit switched network, the method comprising the following steps:

receiving, at a serving call session control function node (S-CSCF node), a request communication which is addressed to a recipient user;

A) receiving, at a service identifier node of the first network operator from the first packet switched network of the first network operator, the request communication which is addressed to the recipient user, wherein the communication request is a SIP INVITE message, the recipient user being a user of the second network operator, said request communication including one or more communication features, the first network operator being for providing communications to the users of the first network operator, the second network operator being for providing communications to the users of the second network operator, the second network operator having at least a second packet switched network and a second circuit switched network, the first circuit switched network being connected to the second circuit switched network through mobile switching circuits, the first packet switched network being connected to the second packet switched network through network-network interface session border controllers, the first packet switched network being connected to the first circuit switched network through a first media gateway control function node, the second packet switched network being connected to the second circuit switched network through a second media gateway control function node;

B) comparing, by the service identifier node, the said communication features of the request with feature tags for a type of communication requested, said predetermined communication features being associated with one or more of: predetermined users of the first network operator; or, predetermined users of the second network operator;

C) routing the communication to the recipient user through the second circuit switched or second packet switched network of the said one or more network operators in dependence upon the comparison; wherein the feature tags are indicators of the type of communication required and codecs to be used for each type of communication, and sequential steps comprising:

the service identifier node modifying the SIP INVITE, by adding a prefix which indicates the request be routed towards the second circuit switched network, in dependence upon the comparison:

the service identifier node routing the modified SIP INVITE to the S-CSCF node before onward routing;

sending the modified SIP INVITE from the S-CSCF node to the first media gateway control function node; and sending the modified SIP INVITE from the first media gateway control function node to the recipient user via at least one of the mobile switching circuits.

2. The method according to claim 1, wherein said feature tags used in step (B) comprise a quality of service mark which indicates if the user wishes to use a network having an assured quality of service for said type of communication requested and wherein the routing in step (C) is made to the circuit switched network of the said one or more network operators in an event that the assured quality of service is indicated by the mark.

3. The method according to claim 1, wherein said feature tags include one or more of: preferences of the user for receiving the respective type of communication; the traffic conditions of the network(s); the user's rate; or any other factor that conditions the network in which the communication is to be received.

4. The method according to claim 3, wherein the step of routing the request for communication towards the second circuit switched network includes obtaining the direction of the following node towards which the request is to be routed and routing the request to the said following node, the said following node routing the communication through the second circuit switched network.

5. The method according to claim 1, wherein the communication features include an alternative types of communication used in an event of a negotiation.

6. The method according to claim 1 where in the packet switched network is an IP-Multimedia Subsystem (IMS) network.

7. The method according to claim 1, wherein the service identifier node has access to a database, which is accessed in step (B) and which includes the set of communication features allowed for each user and for each type of communication allowed, an indication of the type of network to which the communication be routed for said type of communication.

8. The method according to claim 1, wherein in the event that the communication request does not include known communication features, the requested communication is assumed that the communication is a voice-type communication.

9. The method according to claim 1, wherein the voice-type communication is considered allowed for all the users.

10. The method according to claim 1, wherein the type of communication is selected from the group: voice, video, images, instant messaging, sending files between two terminals or any other type of multimedia communication.

11. The method according to claim 1, wherein one or more of the communications network operators is a mobile telephony operator.

12. A method for routing communications between users of one or more communications network operators, the one or more communications network operators including at least a first network operator and a second network operator, the first network operator having at least a first packet switched network and a first circuit switched network, the method comprising the following steps:
A) receiving, at a service identifier node of the first network operator from the first packet switched network of the first network operator, a request communication which is addressed to a recipient user, the recipient user being a user of the first network operator or the second network operator, said request communication including one or more communication features, the first network operator being for providing communications to the users of the first network operator, the second network operator being for providing communications to the users of the second network operator, the second network operator having at least a second packet switched network and a second circuit switched network, the first circuit switched network being connected to the second circuit switched network through mobile switching circuits, the first packet switched network being connected to the second packet switched network through network-network interface session border controllers, the first packet switched network being connected to the first circuit switched network through a first media gateway control function node, the second packet switched network being connected to the second circuit switched network through a second media gateway control function node;
B) comparing, by the service identifier node, the said communication features of the request with feature tags for the type of communication requested, said predetermined communication features being associated with one or more of: predetermined users of the first network operator; or, predetermined users of the second network operator; and,
C) routing the communication to the recipient user through the first circuit switched network, first packet switched network, second circuit switched network or second packet switched network of the said one or more network operators in dependence upon the comparison;
wherein the feature tags are indicators of the type of communication required and the codecs to be used for each type of communication,
wherein the step of routing the request for communication towards the first circuit switched network or second circuit switched network includes the service identifier node modifying the recipient included in the request for communication by adding a prefix which indicates the request should be routed towards the first circuit switched network or second circuit switched network and then routing the communication through the first circuit switched network or second circuit switched network,
wherein the request being indicated by the prefix to be routed towards the first circuit switched network or second circuit switched network includes one of the steps of:
(a) returning the request to a serving call session control function node, from which the request has originally been directed to the service identifier node, before proceeding with the request to be routed through the first circuit switched network or second circuit switched network to the recipient, and
(b) the identifier node obtaining the direction of a subsequent node towards which the request is to be routed and then routing the request to the subsequent node, wherein the subsequent node routes the communication through the first circuit switched network or second circuit switch network.

13. The method according to claim 12, wherein, prior to step (A) a serving call session control function node (S-CSCF node) of the first packet switched network receives the request addressed to the recipient user and the S-CSCF node checks whether the recipient user is a user of the first network operator or a user of another network operator, and
wherein, when the recipient user is a user of the first network operator then the S-CSCF node consults an HSS (Home Subscriber Server) node, and routes the request from the S-CSCF node to the service identifier node.

14. The method according to claim 12, wherein, if the recipient user is a user of a further network operator, then, prior to step (A) a serving call session control function node (S-CSCF) of the first network operator consults a Domain Name Server (DNS) node and, as a result the request is sent by the S-CSCF node to the service identification node.

15. The method according to claim 14, wherein, if the requested communication is a voice-type communication or the requested communication is indicated that the second network operator wants the communication to be routed through the second circuit switched network, the service identifier node routes the message to request communication towards the second circuit-switched network.

16. The method according to claim 14, wherein, if the requested communication is not a voice-type communication and the requested communication is not indicated that the second network operator wants the communication to be routed through the second circuit switched network, the service identification node routes the request for communication to the second packet switched network of the second operator.

17. A system for routing communications between users of a network, the network comprising one or more communications network operators, the one or more communications network operators including at least a first network operator and a second network operator, the first network operator having at least a first packet switched network and a first circuit switched network, the system comprising:
a service identifier node of the first network operator, configured for receiving a request communication from the first packet switched network of the first network operator, the request communication being addressed to a recipient user, the recipient user being a user of the first network operator or the second network operator, said request communication including one or more communication features, the first network operator being for providing communications to the users of the first network operator, the second network operator being for providing communications to the users of the second network operator, the second network operator having at least a second packet switched network and a second circuit switched network, the first circuit switched network being connected to the second circuit switched network through mobile switching circuits, the first packet switched network being connected to the second packet switched network through network-network interface session border controllers, the first packet switched network being connected to the first circuit switched network through a first media gateway control function node, the second packet switched network being connected to the second circuit switched network through a second media gateway control function node, wherein the service identifier node is further configured to compare the said communication features of the request, with feature tags for the type of communication requested, said predetermined communication features being associated with one or more of: predetermined users of the first network operator; or, predetermined users of the second network operator; and, wherein the one or more first communications network operators is arranged to route the communication to the recipient user through the first or second circuit switched or first or second packet switched network of the one or more network operators in dependence upon the comparison, wherein the request communication is a SIP INVITE message,
wherein the service identifier node modifies the SIP INVITE by adding a prefix which indicates the request be routed towards the first or second circuit switched network, in dependence upon the comparison,
wherein the service identifier node routes the modified SIP INVITE to a serving call session control function node (S-CSCF node) before onward routing,
wherein the modified SIP INVITE is sent from the S-CSCF node to the first media gateway control function node: and
wherein the modified SIP INVITE is sent from the first media gateway control function node to the recipient user.

18. The system according to claim 17, wherein at least the first packet switched network is an IP Multimedia Subsystem (IMS) network.

19. The system according to claim 17, wherein the service identifier node comprises a database which includes for each user of the first network operator a set of predetermined communication features allowed for said user and for each type of communication allowed, an indication of the type of network in which the communication continue for said type of communication.

20. The system according to claim 17, wherein the service identifier node comprises a database which includes for each other communications network operators with which the first network operator are interconnected, a set of communication features allowed for said operator and for each type of communication allowed, an indication of the type of network in which the communication continue for said type of communication.

21. The system according to claim 17, wherein a service identification application server (SIAS) is adapted in use to function as the service identification node.

22. A method for routing communications between users of one or more communications network operators, the one or more communications network operators including at least a first network operator and a second network operator, the first network operator having at least a first packet switched network and a first circuit switched network, the method comprising the following steps:
A) receiving, at a service identifier node of the first network operator from the first packet switched network of the first network operator, a request communication which is addressed to a recipient user, the recipient user being a user of the first network operator or the second network operator, said request communication including one or more communication features, the first network operator being for providing communications to the users of the first network operator, the second network operator being for providing communications to the users of the second network operator, the second network operator having at least a second packet switched network and a second circuit switched network, the first circuit switched network being connected to the second circuit switched network through mobile switching circuits, the first packet switched network being connected to the second packet switched network through network-network interface session border controllers, the first packet switched network being connected to the first circuit switched network through a first media gateway control function node, the second packet switched network being connected to the second circuit switched network through a second media gateway control function node;
B) comparing, by the service identifier node, the said communication features of the request with feature tags for the type of communication requested, said predetermined communication features being associated with one or more of: predetermined users of the first network operator; or, predetermined users of the second network operator 0J3erators;
C) routing the communication to the recipient user through the first or second circuit switched or first or second packet switched network of the said one or more network operators in dependence upon the comparison; wherein the feature tags are indicators of the type of communication required and the codecs to be used for each type of communication, wherein the request communication is a SIP INVITE message: and
sequential steps comprising:
the service identifier node modifying the SIP INVITE, by adding a prefix which indicates the request be routed towards the first or second circuit switched network in dependence upon the comparison;
the service identifier node routing the SIP modified INVITE to a serving call session control function node (S-CSCF node) before onward routing:
sending the modified SIP INVITE from the S-CSCF node to the first media gateway control function node: and
sending the modified SIP INVITE from the first media gateway control function node to the recipient user.

23. A non-transitory computer readable medium for routing communications between users of one or more communications network operators, the one or more communications network operators including at least a first network operator and a second network operator, the first network operator having at least a first packet switched network and a first circuit switched network, the non-transitory computer readable medium including the steps of:

receiving, at a serving call session control function node (S-CSCF node), a request communication which is addressed to a recipient user;

A) receiving, at a service identifier node of the first network operator from the first packet switched network of the first network operator, the request communication which is addressed to the recipient user, wherein the communication request is a SIP INVITE message, the recipient user being a user of the second network operator, said request communication including one or more communication features, the first network operator being for providing communications to the users of the first network operator, the second network operator being for providing communications to the users of the second network operator, the second network operator having at least a second packet switched network and a second circuit switched network, the first circuit switched network being connected to the second circuit switched network through mobile switching circuits, the first packet switched network being connected to the second packet switched network through network-network interface session border controllers, the first packet switched network being connected to the first circuit switched network through a first media gateway control function node, the second packet switched network being connected to the second circuit switched network through a second media gateway control function node;

B) comparing, by the service identifier node, the said communication features of the request with feature tags for the type of communication requested, said predetermined communication features being associated with one or more of: predetermined users of the first network operator; or predetermined users of the second network operator;

C) routing the communication to the recipient user through the second circuit switched or second packet switched network of the said one or more network operators in dependence upon the comparison; wherein the feature tags are indicators of the type of communication required and codecs to be used for each type of communication, and sequential steps comprising:

the service identifier node modifying the SIP INVITE, by adding a prefix which indicates the request be routed towards the second circuit switched network, in dependence upon the comparison;

the service identifier node routing the modified SIP INVITE to the S-CSCF node before onward routing;

sending the modified SIP INVITE from the S-CSCF node to the first media gateway control function node; and sending the modified SIP INVITE from the first media gateway control function node to the recipient user via at least one of the mobile switching circuits.

* * * * *